Patented Feb. 5, 1935

1,989,904

UNITED STATES PATENT OFFICE 1,989,904

ANTHRAQUINONE-ACRIDONE IMIDE COMPOUNDS AND THEIR PRODUCTION

Alexander J. Wuertz, Wilmington, Del., assignor to E. I. du Pont de Nemours & Company, Wilmington, Del., a corporation of Delaware No Drawing. Application May 21, 1929, Serial No. 364,943

24 Claims. (Cl. 260—37)

This invention relates to new anthracene dyestuffs and intermediates formed in the course of their preparation. More particularly, it relates for example, (1) To the dicarboxylic acid derivatives of anthraquinone which derivatives have the general formula

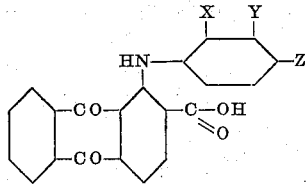

(wherein one of the substituents X, Y and Z represents the radical

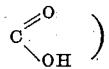

)

(2) To the carbonyl chlorides of the anthraquinone-phenyl acridones derived from the above compounds upon treating with a condensing agent, as thionyl chloride or phosphorous pentachloride and heating, which chlorides have the general formula

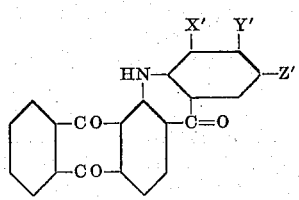

wherein one of the substituents X', Y' and Z' represents the group

(3) And finally to the dyestuffs obtained from the latter above compounds by condensing with aliphatic primary amines or with aromatic primary amines, such, for example, as amino anthraquinones, which dyestuffs have the general formula

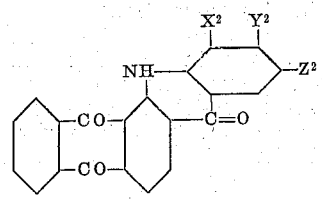

where one of the substituents $X^2$, $Y^2$ and $Z^2$ represents the group —CO—NH—R, in which R is an organic radical, preferably, aromatic.

The prior art patents German #237,236; British #894 of 1911; French #425,859 and United States #1,011,068 deal with the condensation products of halogen-anthraquinone derivatives with primary amino derivatives where one but not both derivatives contains a carboxylic acid group. The resultant products thus obtained have the following general structures:

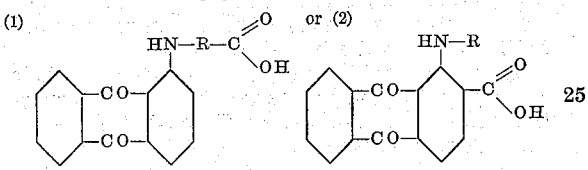

where the carboxylic acid groups are in the ortho-position to the (—NH) radical regardless of whether the

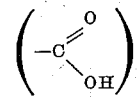

groups are in the anthraquinone nucleus or in the substituent radical (—R).

Furthermore, it is of general knowledge in the field of anthraquinone chemistry that, when there is present as in the above compounds a carboxylic acid group in a dianthraquinonylamine derivative or in an anthraquinone-phenyl-amino derivative as well as in an anthraquinone-naphthyl-amino derivative, if said carboxylic acid group is in the ortho-position or adjacent to the amino group, the formation of the acridone structure takes place upon subjecting these compounds to a treatment with such condensing agents as phosphorous pentachloride, thionyl chloride, acetyl chloride, phosgene, benzo-trichloride or even concentrated sulphuric acid. These general principles may be illustrated by the following example:

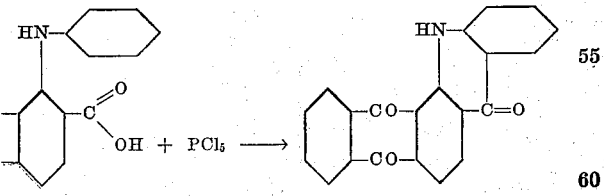

Other examples could be given. However, these will suffice for illustrating the fundamental principles under consideration.

The acridone dyes prepared from such intermediates, however, with the possible exception of two or three, have poor covering power on the fiber and furthermore they have a tendency to bleed, which, obviously, is a disadvantage.

This being the present state of the art, the primary object of the present invention is therefore the preparation of vat dyes of the anthraquinone-acridone type which are free from the objections common to the dyes of this type heretofore known. Another object is the preparation of intermediates from which the new dyes may be prepared. Other objects will appear more fully from the following description:

With these objects in view I have conceived the idea that if a new anthraquinone derivative could be prepared which had a carbonyl chloride grouping, it would be possible to prepare a new line of valuable colors which would have the advantages of both an acridone as well as a carbonyl-imide structure. The anthraquinone-acridone molecule was deemed suitable for this purpose.

These objects are accomplished by the following discoveries:

When 1-halogen-anthraquinone-2-carboxylic acid is condensed with such aromatic primary amino-carboxylic acids as anthranilic, meta- and para-amino-benzoic acids or naphthyl-amino-carboxylic acids in a medium of an alkaline solution and in the presence of a catalyst as a copper salt, preferably cupric chloride or copper sulphate, a reaction ensues which results in the formation of dicarboxylic acid derivatives of anthraquinone, which, to my knowledge, are novel and are not recorded in the literature.

These new acids have the following probable structures, each one corresponding to the respective aromatic amino-carboxylic acid from which they may be derived:

(1)

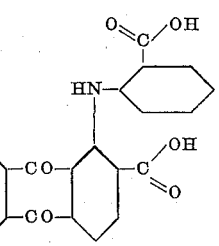

Ortho-derivative (2)

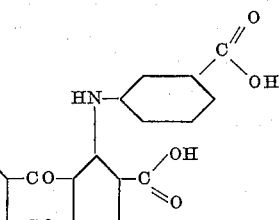

Meta-derivative (3)

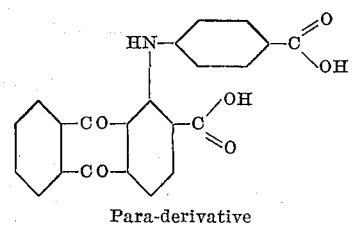

Para-derivative

As already noted, the foregoing compounds by virtue of having one carboxylic acid group in the ortho position to the (—NH) linkage are capable of forming anthraquinone acridones when treated with such condensing agents as an excess of thionyl chloride or a slight excess of phosphorous pentachloride, or other suitable condensing agents, in a medium of an inert solvent such as nitrobenzene, solvent naphtha, dichlorobenzene or toluene.

When a suitable chloride is employed as the condensing agent before the ring closure takes place the dicarbonyl-chloride is formed which, when heated, passes over to the acridone structure, the reaction being accompanied by an elimination of hydrogen chloride. Under these conditions the carbonyl chloride group in the substituent nucleus remains intact in a stable condition. The resultant compound from such a chemical reaction, when the condensation product from 1-chloro-anthraquinone-2-carboxylic acid and para-amino-benzoic acid is used, would be the carbonyl-chloride of 2,1-anthraquinonylene-phenyl-acridone which has the following configuration:

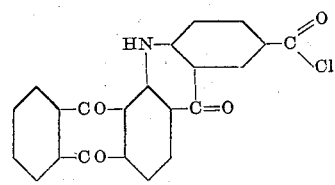

The latter structural formula indicates that we have a simple anthraquinonylene-acridone, well-known in the field of anthraquinone chemistry, plus a carbonyl-chloride radical which constitutes a new and novel substituent. It is this group or radical which confers entirely new physical and chemical properties upon the molecule. This acid-chloride group is capable of reacting with strong and weak bases and salts such as the primary amine derivatives of both the aliphatic and aromatic series, including the amines of the anthraquinone type and many others.

The chemical behavior of these anthraquinone-phenyl-acridone-carbonyl chlorides is of unusual importance to the synthesis of new vat dyes. They will readily condense with aliphatic and aromatic primary amines to form pink and violet colors. Furthermore, they lend themselves quite readily to simple codensations with all the amino derivatives of anthraquinone, producing colors which fall into the fast orange shades.

The invention will now be described more particularly as to its various phases.

DI-CARBOXYLIC ACID DERIVATIVES OF ANTHRAQUINONE

As already indicated the first step in the preparation of the new dyes involves the preparation of the di-carboxylic acid derivatives of anthraquinone. The following examples will illustrate the general procedure for the derivation of the aforesaid compounds.

*Example 1*

200 parts of 1-chloro-anthraquinone-2-carboxylic acid and 100–110 parts of para-amino-benzoic acid are suspended in 2000–2500 parts of water. This suspension is then made alkaline with a sufficient quantity of caustic soda (solid or solution) to just turn the solution to the alkaline side. Both of the carboxylic acids will go into solution under these conditions. To this solution are then added 600–800 parts of sodium or potassium carbonate and 25-50 parts of cupric chloride and the whole is heated to the boiling point (100-104° C.), and maintained at this point for a period of six to eight hours, or until no further deepening of the color takes place. The solution is then diluted with twice its original volume of hot water and filtered directly. The filtrate will contain the dicarboxylic acid sought and the residue will consist of copper salts and small amounts of by-products of an indefinite constitution. In order to isolate the free acid it is only necessary to acidify the filtrate with a mineral acid such as dilute hydrochloric or dilute sulphuric acid and by filtering off the precipitate a pure product is obtained which, after drying, is an orange-red powder, soluble in alkaline solution and insoluble in dilute acids, but soluble in strong sulphuric acid (colorless or slightly yellow solution).

Instead of using para-amino-benzoic acid, meta-amino-benzoic acid and ortho-amino-benzoic acid as well as the amino-naphthoic acids may be used under the conditions similar to those described above, whereupon the corresponding dicarboxylic acids are obtained.

*Example 2*

200 parts of 1-chloro-anthraquinone-2-carboxylic acid and 110-120 parts of para-aminosalicylic acid are suspended in 2000-2500 parts of water and made alkaline as indicated in Example 1. 600-800 parts of sodium carbonate are then added, followed by 25-50 parts of cupric chloride and the charge is heated in the same manner as in the previous example. Under these conditions there is obtained a dicarboxylic acid which contains a hydroxyl-group in the phenyl-amine nucleus. This product has the following configuration:

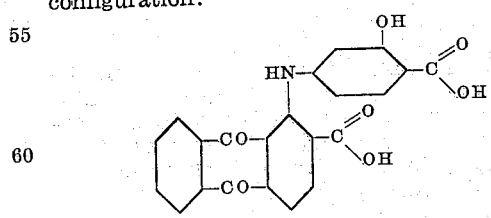

and consists of a violet powder, extremely soluble in an alkaline solution and in general has similar properties to the products described in Example 1. Instead of using para-amino-salicylic acid the isomeric meta- and ortho-derivatives may be used, thus arriving at the respective isomeric hydroxy-dicarboxylic acids.

In the above examples the cupric chloride is employed as a catalyst for the reaction.

ANTHRAQUINONE CARBONYL CHLORIDES

In order to obtain the anthraquinone carbonyl chlorides, it is only necessary to subject the dicarboxylic acid derivatives of anthraquinone obtained as just described to the action of a condensing agent of the type of thionyl chloride or phosphorous pentachloride in an inert solvent. The complex reactions involved may be expressed in the following manner in the case where 2-carboxy-1-anthraquinonyl-amino-para-phenyl-carboxylic acid is employed as the intermediate:

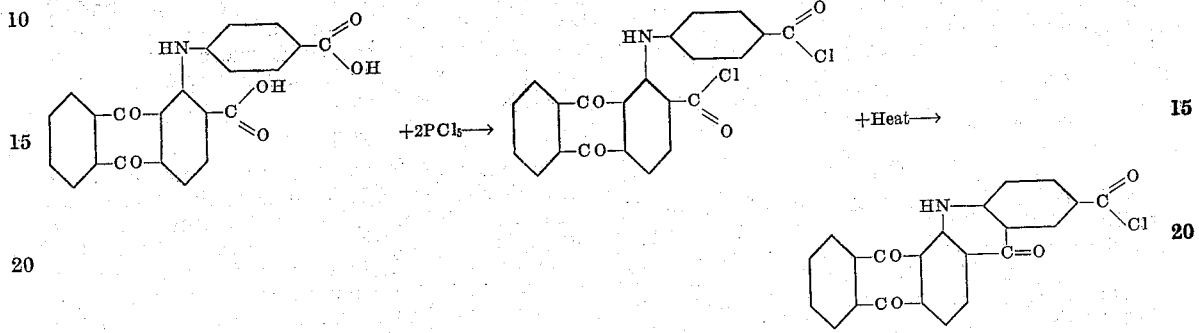

The resultant new compound is 2-1-anthraquinone-phenyl-acridone-para-carbonyl chloride. If the corresponding ortho- or the meta-carbonyl chlorides are desired it is only necessary to take the respective isomeric carboxylic acid derivatives and subject them to a similar treatment. The most valuable product, however, is the compound in which the residual carbonyl chloride group is in the para-position.

The subsequent examples are furnished for the purpose of illustrating this type of compound.

*Example 3*

200 parts of 1-(4'-carboxy-anilido)-2-carboxy-anthraquinone, obtained by Example 1, are suspended in 800 to 1000 parts of nitrobenzene under good agitation. To this suspension are added, in a period of one-half to one hour, 250 parts of anhydrous phosphorous pentachloride. The reaction takes place without any external heating and the dicarboxylic acid is converted to the dicarbonyl chloride. (This product may be isolated if desired.) After one to two hours of vigorous agitation the reaction mass is slowly heated to 90°-100° C. and maintained at this point for a period of two hours or until no further reaction takes place.

During the course of the heating at 90°-100° C. the carbonyl chloride group in the anthraquinone ring enters into a reaction with the phenyl-nucleus to form the acridone configuration. This is accompanied by a loss of hydrogen chloride. The carbonyl chloride in the para-position in the phenyl-group remains intact.

When the reaction is completed the crystalline precipitate is allowed to cool to 20°-30° C. and is then filtered off and washed with either benzene, xylene, toluene or solvent naphtha and subsequently dried at 100°-120° C. in the absence of moisture.

The product thus obtained is the 2-1-anthraquinone-phenyl-acridone-para-carbonyl chloride which has the following structure:

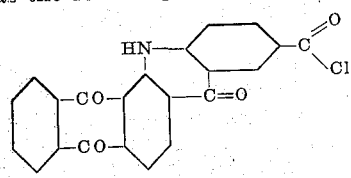

If the corresponding ortho- and meta-carboxylic acids are used under identical conditions the respective acridone-carbonyl chlorides are formed. These have analogous structures, being isomeric with the former product:

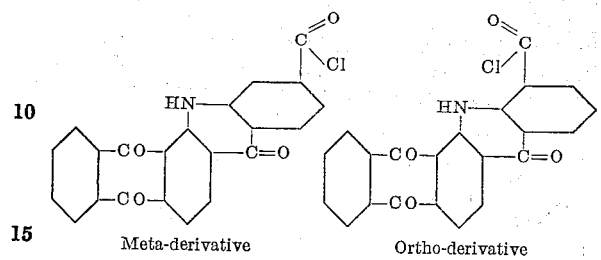

Meta-derivative    Ortho-derivative

Example 4

200 parts of 1-(4'-carboxy-anilido)-2-carboxy-anthraquinone, obtained by Example 1, are suspended in 1000 parts of solvent naphtha under good agitation. To this suspension are added 250 parts of anhydrous phosphorous pentachloride. From this point the procedure is as indicated in Example 3. The final product is identical with the product obtained in the previous example.

Example 5

200 parts of 1-(4'-carboxy-anilido)-2-carboxy-anthraquinone are suspended in 1000 parts of solvent naphtha. To this suspension are added 400 parts of thionyl chloride and the suspension, under good agitation, is heated under a reflux at 80° to 90° C. for eight hours. Then, under distillation of the excess of thionyl chloride, the temperature is raised to 110°–120° C. for a period of two to three hours. The reaction mass is allowed to cool to 20°–30° C. and isolated in the same manner as indicated in Example 3. The final product is identical with the product obtained in the previous examples.

The compounds so obtained are new intermediates of particular value in the preparation of the group of new dyes disclosed below.

DYESTUFFS

Having now fully described the methods for the synthesis of the anthraquinone-carbonyl chlorides, it is our purpose to illustrate by means of several examples how a group of new and valuable dyestuffs may be prepared by the use of the aforesaid intermediate products.

The anthraquinone-acridone-carbonyl chlorides, having a general structural formula:

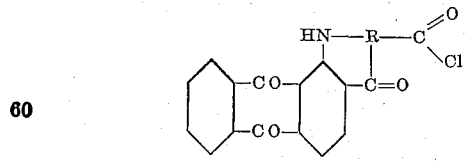

where R is meant to represent a phenyl, naphthyl or other aryl nucleus, by virtue of possessing a carbonyl chloride radical, are capable of combining with primary amino-derivatives of the aliphatic, aromatic and the anthraquinone types. When such primary amines as methyl- and ethyl-amines, butyl- and propyl-amines, methanol- and ethanol-amines, cyclo-hexyl-amines, aniline, ortho- and para-toluidines, para-amino-phenol and para-phenylene-diamine, benzidine and the naphthylamines are condensed with molecular equivalents of 2-1-anthraquinone-phenyl-acridone-carbonyl chlorides (ortho-, meta-, or para- isomers) the resultant anthraquinone-acridone-carbonylimides are dyestuffs which dye cotton and rayon in yellowish-pink to light violet-red shades.

If, on the other hand, the anthraquinone-acridone-carbonyl chlorides are condensed with the primary amino derivatives of the anthraquinone series the resultant products are dyestuffs which dye cotton from an alkaline hydrosulphite vat in strong red-orange to brown shades, the shade depending upon which of the several amines is used in the condensation. The subsequent examples will illustrate how these products may be obtained.

Example 6

100 parts of 2-1-anthraquinone-phenyl-acridone-5'-carbonyl chloride (Example 3) are suspended in 1000 parts of nitrobenzene. To this suspension are added 90 parts of monobenzoyl-1,5-diamino-anthraquinone and the whole heated to 140-160° C. for a period of four to six hours. The dyestuff thus formed, through an elimination of hydrogen chloride, is then filtered off and washed with alcohol or benzene to remove the adherent nitrobenzene. The product, when dry, is an orange-red powder, only slightly soluble in most ordinary organic solvents. It is soluble in concentrated sulphuric acid, giving a solution having a light yellow color which, upon dilution, gives an orange-red precipitate. The powder or paste dyes cotton from a dark blue-violet alkaline hydro-sulphite vat in blue-black shades which upon exposure to the air turn to bright red-orange shades. The dyeings are very fast to sunlight, oxidizing agents such as the hypochlorites, and all ordinary fastness tests which characterize the fastest vat dye.

The product thus obtained, from the manner in which it is synthesized, has the following structure:

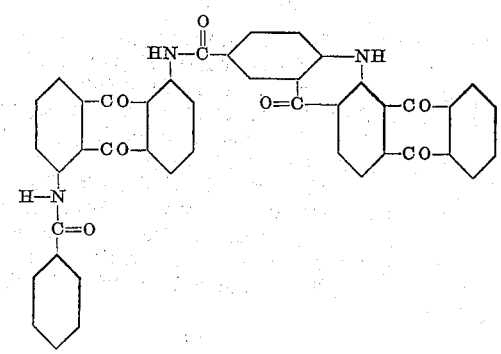

It is apparent that this new dye has both the acridone and the carbonylimide structure. This product is particularly characterized by its enormous covering power and is, in its paste form, suitable for printing either by itself or in combination with other vat dyes.

Example 7

100 parts of 2-1-anthraquinone-phenyl-acridone-5'-carbonyl chloride (Example 3) are suspended in 1000 parts of nitrobenzene. To this suspension are added 30 parts of 1,5-diamino-anthraquinone and the whole is then heated to 140–180° C. for a period of four to six hours. The orange-red or reddish-brown mass is then isolated as in Example 6.

The dry product obtained here represents a red-brown powder having similar properties to the color described in the previous example. It dyes cotton from a violet-brown alkaline hydrosulphite vat in deep blue-black shades which upon exposure to the air turn to deep orange-red to reddish-brown shades. The fastness properties are equally as good as those which distinguish the product in Example 6.

This valuable dyestuff, from the manner in which it is prepared, has the following constitutional formula:

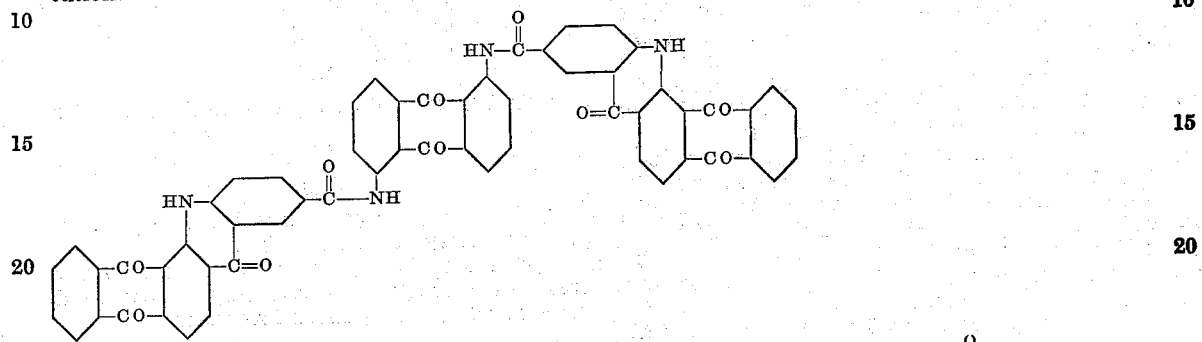

In place of the monobenzoyl-1,5-diamino-anthraquinone and the 1,5-diamino-anthraquinone, other amino derivatives may be substituted. For example, alpha- and beta-amino-anthraquinone, 1,8-, 2,6-, 2,7-, and 1,4-diamino-anthraquinones, 1-amino-2-methyl- and 1-amino-6- and also 1-amino-5-chloro-anthraquinones, under similar conditions to those specified in Examples 6 and 7, will give products which vary from light orange to deep red-orange and brown shades.

Instead of using nitrobenzene as a medium in the condensation, dichlorobenzene or solvent naphtha may be used.

Example 8

100 parts of 2-1-anthraquinone-phenyl-acridone-5'-carbonyl chloride (Example 3) are suspended in 1000 parts of dichlorobenzene. To this suspension are added 30 parts of aniline and the whole is heated to 140–150° C. for a period of three to five hours. The red crystalline mass is cooled to 100° C. and isolated by filtration and washing with alcohol. The dry powder thus obtained is soluble in concentrated sulphuric acid with a light yellow color. It is only slightly soluble in nitrobenzene. It dyes from an alkaline hydrosulphite vat in yellowish-pink shades, which are not very fast to washing.

Similar products may be obtained when either the ortho-, meta-, or the para-acridone-carbonyl chlorides are condensed with other aliphatic or aromatic amines. These colors, while some of them are not suitable for dyeing, are suitable for the preparation of pigments. Some of the principal products are represented, for example, by the following:

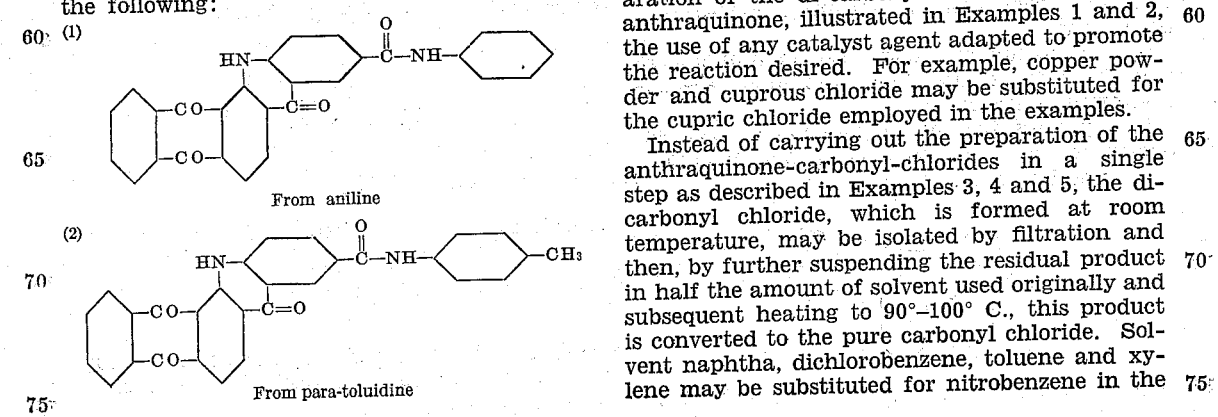

(3)
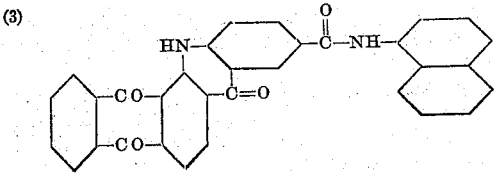
From naphthylamine (4)
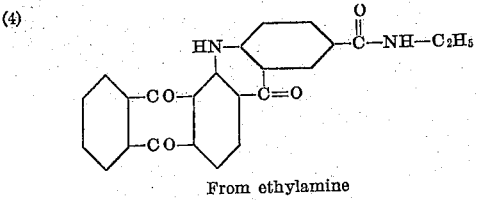
From ethylamine (5)
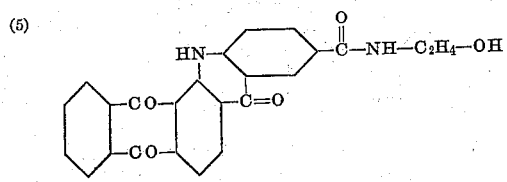
From ethanolamine (6)
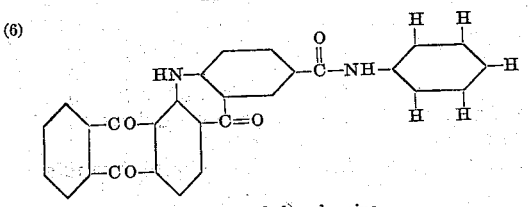
From cyclo-hexyl-amine The foregoing represent types of the various homologues of the respective amino-derivatvies.

Although a large number of representative examples have been furnished above, it is to be understood that these are presented for purposes of illustration only and that I do not intend to be limited to the particular reagents and conditions therein specified.

Thus, the invention contemplates, in the preparation of the di-carboxylic acid derivatives of anthraquinone, illustrated in Examples 1 and 2, the use of any catalyst agent adapted to promote the reaction desired. For example, copper powder and cuprous chloride may be substituted for the cupric chloride employed in the examples.

Instead of carrying out the preparation of the anthraquinone-carbonyl-chlorides in a single step as described in Examples 3, 4 and 5, the dicarbonyl chloride, which is formed at room temperature, may be isolated by filtration and then, by further suspending the residual product in half the amount of solvent used originally and subsequent heating to 90°–100° C., this product is converted to the pure carbonyl chloride. Solvent naphtha, dichlorobenzene, toluene and xylene may be substituted for nitrobenzene in the first example. The best results, however, are obtained with the use of either nitrobenzene or solvent naphtha.

Also instead of the phosphorous pentachloride and thionyl chloride employed as the condensing agent in Examples 3, 4 and 5, other suitable chlorides may be employed as, for example, benzotrichloride.

Furthermore, it will be understood that the compounds employed in the preparation of the dicarboxylic acid derivatives of anthraquinone may contain substituent groups in the aryl nuclei, such, for example, as halogen. It, of course, follows that the anthraquinone carbonyl chlorides may contain corresponding substituents.

Also, it will be understood that the primary amino derivatives which are condensed with the anthraquinone-carbonyl chlorides to yield the new dyestuffs may also contain other substituents in the aryl nuclei than those indicated, as, for example, halogen, nitro-, methoxy-hydroxyl- and sulphonic acid groups.

As many apparently widely different embodiments of this invention may be made without departing from the spirit thereof, it is to be undersood that I do not limit myself to the foregoing examples or description except as indicated in the following patent claims:

I claim:

1. A compound represented by the formula

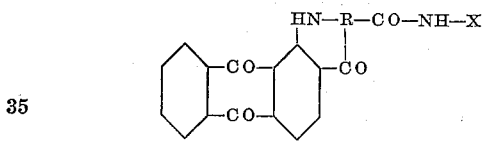

wherein R represents an aryl radical of the benzene or naphthalene series to which the NH and CO groups attached to the anthraquinone nucleus are connected in ortho position and X represents an organic radical of the aliphatic or aromatic series.

2. A compound of the type set forth in claim 1 wherein R represents a benzene nucleus and X represents an aromatic radical.

3. A compound having the general formula

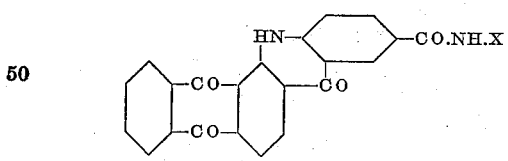

wherein X represents an aromatic radical.

4. A compound of the type set forth in claim 3 wherein X represents an anthraquinone nucleus.

5. A compound of the type set forth in claim 3 wherein X represents a 1-anthraquinone-5-amino nucleus.

6. A compound of the type set forth in claim 3 wherein X represents a 1-anthraquinone-5-benzoyl-amino nucleus.

7. A process for the preparation of new vat dyes which comprises condensing a compound of the general formula

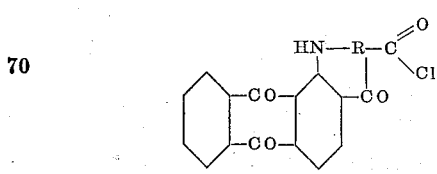

wherein R represents an aryl radical of the benzene or naphthalene series, with a primary amine of the aliphatic or aromatic series.

8. A process for the preparation of new vat dyes which comprises condensing a compound represented by the general formula:

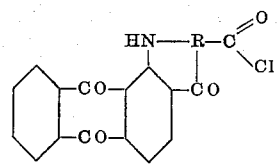

wherein R represents a benzene nucleus and the

group is in the para position to the amino group, with a primary aromatic amine.

9. A process for the preparation of new vat dyes which comprises condensing a compound represented by the general formula:

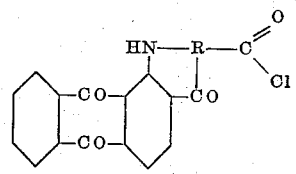

wherein R represents a benzene nucleus and the

group is in the para position to the amino group, with a primary amine of the anthraquinone series.

10. A process for the preparation of new vat dyes which comprises condensing a compound represented by the general formula:

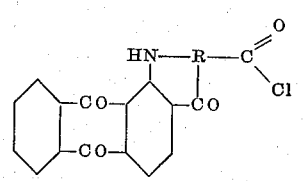

wherein R represents a benzene nucleus and the

group is in the para position to the amino group, with a 1:5-di-amino-anthraquinone.

11. A process for the preparation of new vat dyes which comprises condensing a compound represented by the general formula:

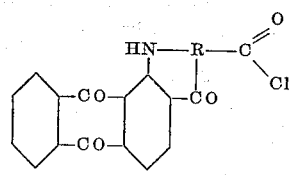

wherein R represents a benzene nucleus and the

group is in the para position to the amino group, with 1-amino-anthraquinone-5-benzoyl-amino-anthraquinone.

12. A compound having the general formula

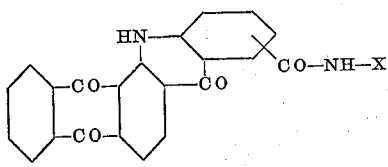

wherein X represents an anthraquinone nucleus which may be substituted by an aroyl amino group.

13. A compound having the general formula

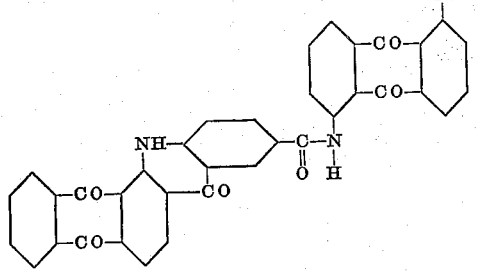

14. A compound having the general formula

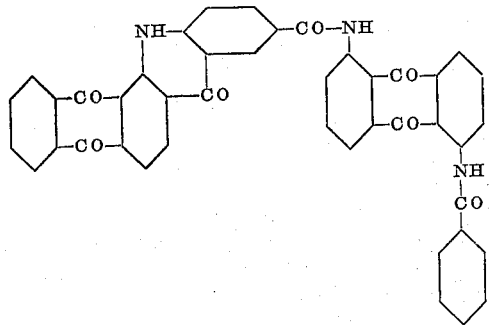

15. A process for the preparation of new vat dyes which comprises condensing a compound of the general formula

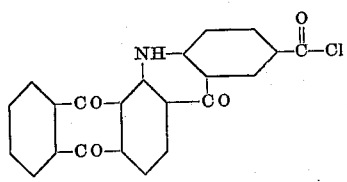

with a compound of the general formula

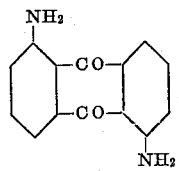

where one of the amino groups may be substituted with a benzoyl group.

16. The process which comprises condensing a 1-halo-2-carboxy-anthraquinone with an amino-carboxy aromatic compound of the benzene or naphthalene series, treating the resultant intermediate with a condensing agent until an acridone carbonyl chloride is formed, and condensing the resultant product with an amine of the aliphatic or aromatic series.

17. Vat dyestuffs corresponding to the general formula

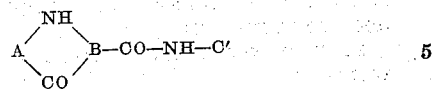

in which A indicates an anthraquinone radical, B represents a radical of the benzene or naphthalene series, and C' represents an aromatic radical, which dyestuffs are sparingly soluble in most organic solvents, give brown to dark blue to violet vats and give colored solutions in concentrated sulfuric acid.

18. Vat dyestuffs corresponding to the general formula

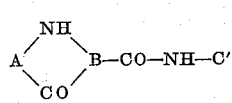

in which A indicates an anthraquinone radical, B represents a radical of the benzene or naphthalene series, and C' represents an anthraquinone radical, which dyestuffs are sparingly soluble in most organic solvents, give brown to dark blue to violet vats and give colored solutions in concentrated sulfuric acid.

19. The process of producing new vat dyestuffs which comprises condensing a compound of the general formula

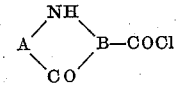

in which A indicates an anthraquinone radical, B represents a radical of the benzene or naphthalene series, with a primary aromatic amine.

20. The process of producing new vat dyestuffs which comprises condensing a compound of the general formula

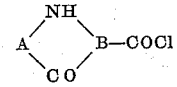

in which A indicates an anthraquinone radical, B represents a radical of the benzene or naphthalene series, with an amino-anthraquinone.

21. The process of producing new vat dyestuffs which comprises condensing an anthraquinone-benzacridone-carboxylic acid chloride with an amino-anthraquinone.

22. The process of producing new vat dyestuffs which comprises condensing an anthraquinone-benzacridone-carboxylic acid chloride with an amino-anthraquinone in an inert organic solvent.

23. The process of producing a vat dyestuff which comprises condensing 1,2-(NH)-anthraquinone-benzacridone-Bz4-carboxyl acid chloride with 1-amino-5-benzoylamino-anthraquinone in nitrobenzene.
24. The vat dyestuff corresponding to the formula:
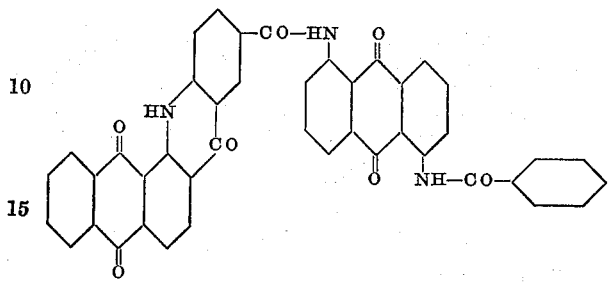
which dyestuff dyes cotton from a red-violet vat orange shades of excellent fastness.
ALEXANDER J. WUERTZ.